United States Patent
Oki et al.

(10) Patent No.: US 9,679,207 B2
(45) Date of Patent: Jun. 13, 2017

(54) TRAFFIC LIGHT DETECTING DEVICE AND TRAFFIC LIGHT DETECTING METHOD

(71) Applicant: Nissan Motor Co., Ltd., Yokohama-Shi, Kanagawa (JP)

(72) Inventors: Takahiko Oki, Kanagawa (JP); Hidekazu Nishiuchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/122,360

(22) PCT Filed: Mar. 10, 2014

(86) PCT No.: PCT/JP2014/056136
§ 371 (c)(1),
(2) Date: Aug. 29, 2016

(87) PCT Pub. No.: WO2015/136594
PCT Pub. Date: Sep. 17, 2015

(65) Prior Publication Data
US 2016/0371552 A1    Dec. 22, 2016

(51) Int. Cl.
*G06K 9/00* (2006.01)
*G06K 9/20* (2006.01)
(Continued)

(52) U.S. Cl.
CPC ......... *G06K 9/00825* (2013.01); *G06K 9/209* (2013.01); *G06K 9/2036* (2013.01);
(Continued)

(58) Field of Classification Search
CPC .. G06K 9/00825; G06K 9/2036; G06K 9/209; G06K 9/4652; G06K 9/4661
See application file for complete search history.

(56) References Cited

U.S. PATENT DOCUMENTS

| 2008/0122607 A1* | 5/2008 | Bradley | B60Q 1/0017 340/468 |
| 2010/0100268 A1* | 4/2010 | Zhang | B60W 30/09 701/25 |

(Continued)

FOREIGN PATENT DOCUMENTS

| CN | 103345766 A | 10/2013 |
| EP | 2596457 A2 | 5/2013 |

(Continued)

OTHER PUBLICATIONS

Anonymous, "Lamp Brightness with AC Physics Forum—The Fusion of Science and Community", https://www.physicsforums.com/threads/lamp-brightness-wth-ac.825099, Aug. 1, 2015, 10 pgs.

*Primary Examiner* — Utpal Shah
(74) *Attorney, Agent, or Firm* — Young Basile Hanlon & MacFarlane, P.C.

(57) ABSTRACT

A traffic light detecting device includes an image capturing unit configured to capture an image of surroundings of a vehicle and a traffic light detecting unit configured to detect a traffic light from the image. The traffic light detecting unit extracts a synchronized pixel with a luminance which varies in synchronization with an alternating current cycle of electric power supplied to the traffic light, and sets a predetermined range including the synchronized pixel as a pixel group. The traffic light detecting unit, then, judges from the synchronized pixel whether or not the traffic light is present when the synchronized pixel is continuously extracted from the pixel group for a predetermined determination period.

9 Claims, 9 Drawing Sheets

(51) Int. Cl.
*G06K 9/46* (2006.01)
*G08G 1/0962* (2006.01)

(52) U.S. Cl.
CPC ......... *G06K 9/4652* (2013.01); *G06K 9/4661* (2013.01); *G08G 1/09623* (2013.01)

(56) References Cited

U.S. PATENT DOCUMENTS

| | | | |
|---|---|---|---|
| 2013/0229521 A1 | 9/2013 | Siecke et al. | |
| 2014/0184800 A1* | 7/2014 | Hirai | G01N 21/958 348/148 |
| 2015/0117715 A1* | 4/2015 | Murao | G06K 9/00825 382/104 |
| 2015/0130853 A1* | 5/2015 | Hada | H04N 9/3155 345/690 |
| 2017/0041591 A1* | 2/2017 | Korogi | G06K 9/00818 |

FOREIGN PATENT DOCUMENTS

| | | |
|---|---|---|
| JP | 2005301518 A | 10/2005 |
| JP | 2007286943 A | 11/2007 |
| JP | 2008134916 A | 6/2008 |
| JP | 2008293277 A | 12/2008 |
| JP | 2012168592 A | 9/2012 |
| WO | 2011106578 A2 | 9/2011 |

* cited by examiner

TRAFFIC LIGHT DETECTING DEVICE AND TRAFFIC LIGHT DETECTING METHOD

TECHNICAL FIELD

The present invention relates to a traffic light detecting device and a traffic light detecting method.

BACKGROUND

There have been heretofore known a traffic light detecting device for detecting a traffic light from an image captured by a camera (see Japanese Patent Application Publication No. 2005-301518). According to Japanese Patent Application Publication No. 2005-301518, a portion indicating a color of a signal lamp is extracted from the image, the circularity indicating how close to a perfect circle the extracted portion is calculated, and a portion having a higher circularity is detected as a candidate for the signal lamp.

To be detected as a candidate for a signal lamp, the extracted portion needs to have an image size large enough for the circularity to be determined. Thus, the technique in Japanese Patent Application Publication No. 2005-301518 has a difficulty in accurately detecting a distant traffic light the image size of which is too small to determine the circularity.

SUMMARY

The present invention has been made in view of the above problem, and an object thereof is to provide a traffic light detecting device and a traffic light detecting method capable of detecting even a distant traffic light with high accuracy.

A traffic light detecting device according to an aspect of the present invention includes an image capturing unit configured to capture an image of surroundings of a vehicle and a traffic light detecting unit configured to detect a traffic light from the image. The traffic light detecting unit extracts a synchronized pixel with a luminance which varies in synchronization with an alternating current cycle of electric power supplied to traffic lights, and sets a predetermined range including the synchronized pixel as a pixel group. The traffic light detecting unit, then, judges from the synchronized pixel whether or not the traffic light is present when the synchronized pixel is continuously extracted from the pixel group for a predetermined determination period.

BRIEF DESCRIPTION OF THE DRAWINGS

FIGS. 9(a) and 9(b) illustrate graphs for comparing the range of the luminance variation between an LED lamp and an incandescent lamp, with FIG. 9(a) illustrating temporal variations of the luminances.

DETAILED DESCRIPTION OF THE EMBODIMENTS

With reference to the drawings, descriptions will be provided for an embodiment. In the drawings, the same parts are denoted by the same reference signs, and descriptions thereof are omitted.

Figure 1:
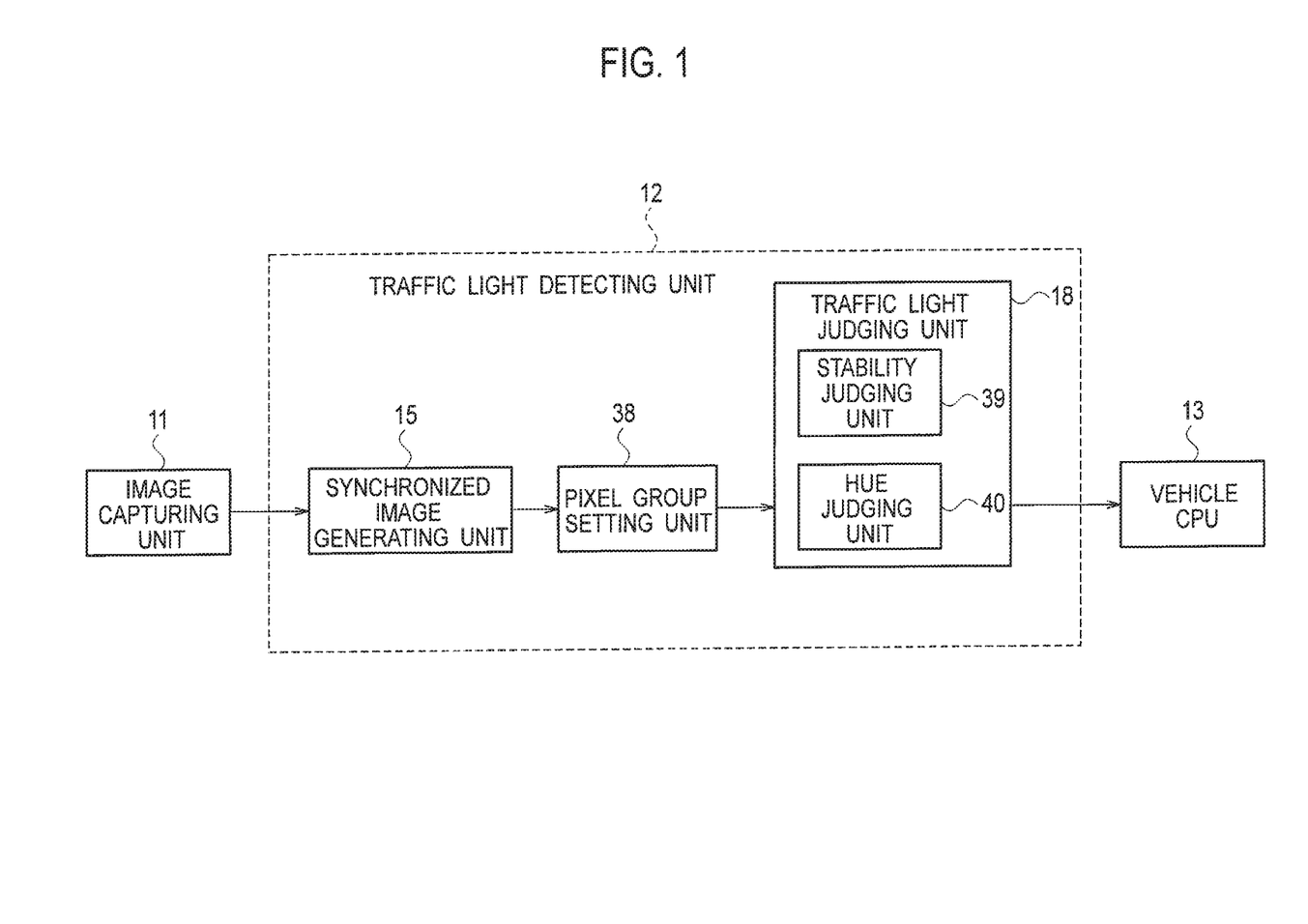
FIG. 1 is a block diagram illustrating an overall configuration of a traffic light detecting device according to an embodiment of the present invention.

With reference to FIG. 1, description will be provided for an overall configuration of a traffic light detecting device according to the embodiment. The traffic light detecting device is mounted on a vehicle and includes an image capturing unit 11 for capturing an image of surroundings of the vehicle and a traffic light detecting unit 12 for detecting a traffic light from the image obtained by the image capturing unit 11.

The image capturing unit 11 is a digital camera using a solid-state image sensor, for example, CCD or CMOS, which obtains a digital image for which an image processing can be performed. The digital camera includes a wide-angle lens having a wide angle of view. The imaging range (angle of view) of the image capturing unit 11 includes a travel direction of the vehicle and road shoulders in the right and left directions in the vicinity of the vehicle. The image capturing unit 11 captures an image repeatedly with predetermined time intervals and obtains a series of multiple images (frames).

The traffic light detecting unit 12 receives the images (hereinafter referred to as "camera images") obtained by the image capturing unit 11 and detects a position of a traffic light in the camera images. The positional information of a detected traffic light is transferred to another processing operation device (vehicle CPU 13) mounted on the vehicle, which includes, for example, a controller to perform automated driving of the vehicle. The traffic light detecting unit 12 includes a microcontroller including, for example, a CPU, a memory, and an input/output unit, which serves as multiple information processing units included in the traffic light detecting device by executing a computer program installed in advance. The traffic light detecting unit 12 repeatedly performs a series of information processes for each series of the multiple camera images (frames) to detect the position of a traffic light from the camera images. The traffic light detecting unit 12 may be included in an ECU which is also used for another control of the vehicle.

The multiple information processing units serving as the traffic light detecting unit 12 includes a synchronized image generating unit 15, a pixel group setting unit 38, and a traffic light judging unit 18. The traffic light judging unit 18 includes a stability judging unit 39 and a hue judging unit 40.

The synchronized image generating unit 15 extracts from the camera images a synchronized pixel with a luminance which varies in synchronization with the alternating current cycle of the electric power supplied to traffic lights and generates synchronized images including the extracted synchronized pixel. For example, the synchronized image generating unit 15 generates a reference signal synchronized with the phase of the electric power supplied to the traffic lights and performs a synchronization detection process of multiplying the reference signal and a luminance signal of each pixel of the camera images together. From this process, a synchronized pixel with a luminance which varies in synchronization with the alternating current cycle of the electric power is extracted.

Figure 2:
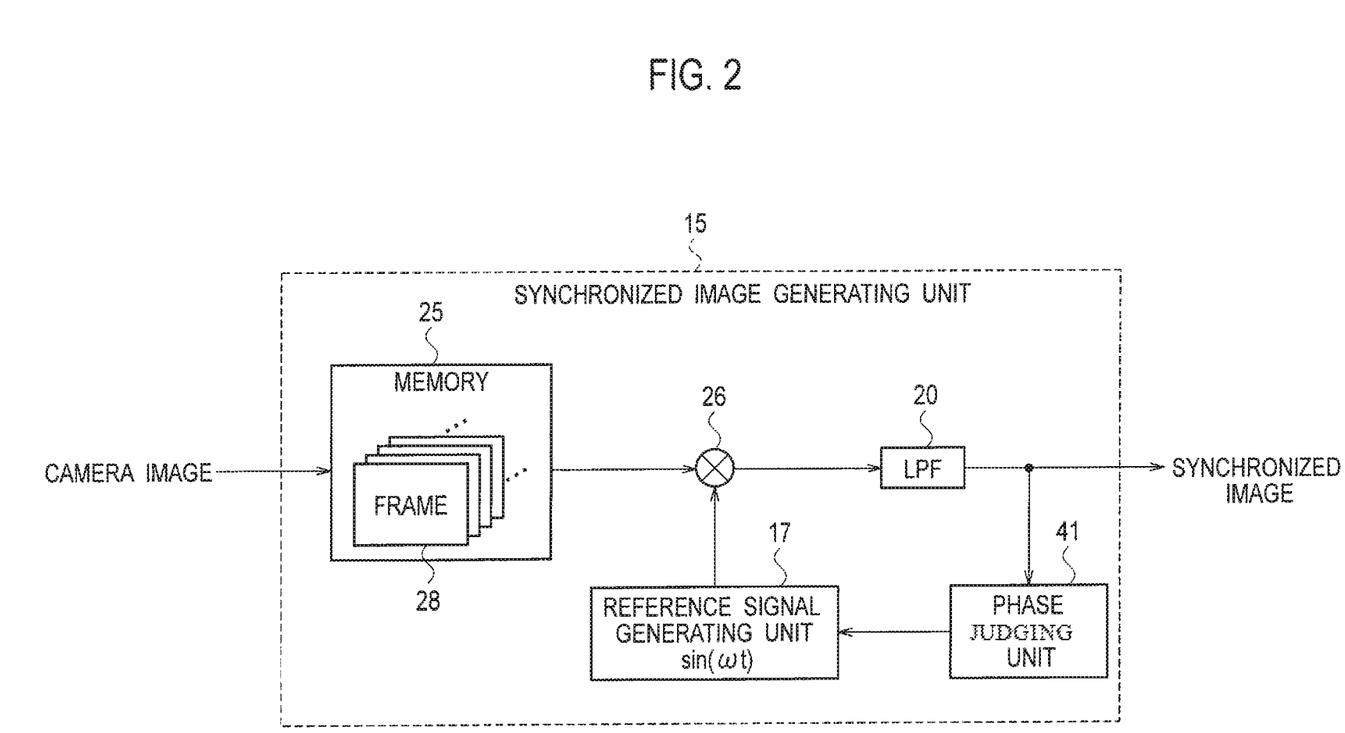
FIG. 2 is a block diagram illustrating a detailed configuration of a synchronized image generating unit 15 illustrated in FIG. 1.
Figure 3A:
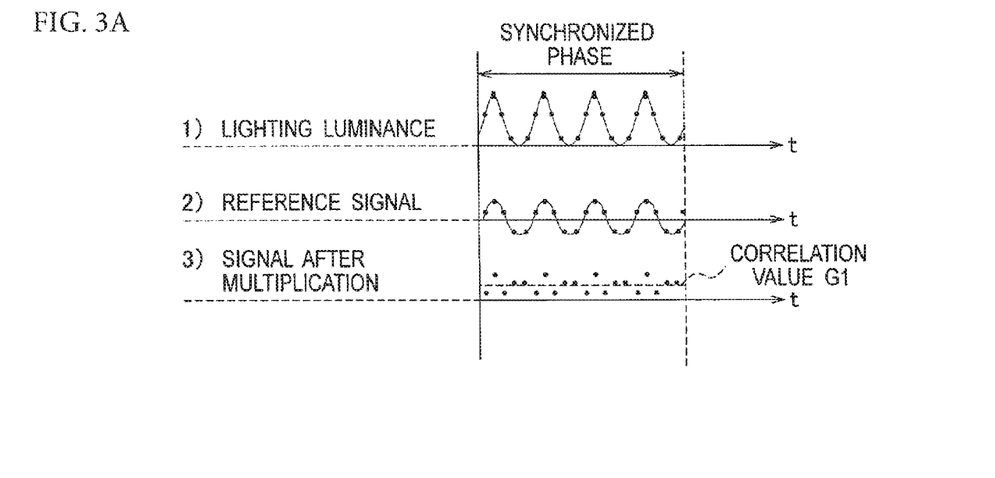
FIGS. 3(a) and (b) illustrate a difference in correlation values between when a phase of a reference signal is synchronized and not synchronized, with FIG. 3(a) illustrating a state where the phase of the reference signal is synchronized with that of an electric power and FIG. 3(b) illustrating a state where the phase of the reference signal is inverted with respect to that of the electric power.
Figure 3B:
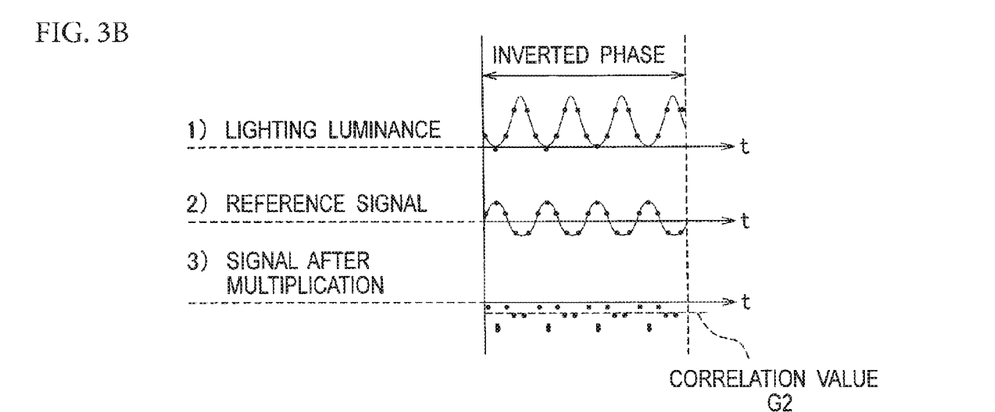

The electric power supplied to the traffic lights is an alternating current power obtained by full-wave rectifying the electric power of the commercial power supply. The luminance of a signal lamp which lights by receiving the supply of the electric power from the commercial power supply varies in the same cycle as the cycle (for example, 100 Hz) of the full-wave rectified alternating current power. For this reason, it is possible to detect the signal lamp which lights by receiving the supply of the electric power from the commercial power supply by extracting from the camera images a synchronized pixel with a luminance which varies in synchronization with the alternating current cycle of the electric power supplied to the traffic lights. The concrete processes will be described later with reference to FIGS. 2 and 3.

Figure 4A:
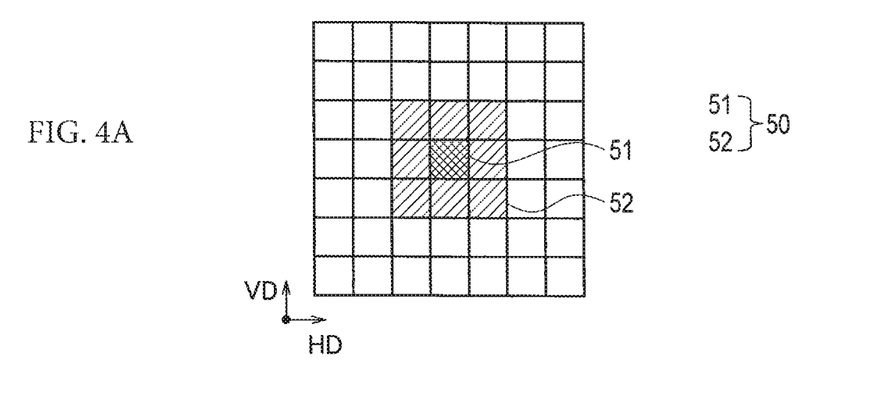
FIGS. 4(a)-4(c) are schematic diagrams in which each of the diagrams illustrates a pixel group 50 to be set as a predetermined range including a synchronized pixel 51, with FIG. 4(a) illustrating a pixel group 50 including neighboring pixels 52 which are horizontally and vertically adjacent to the synchronized pixel 51, FIG. 4(b) illustrating a pixel group 50 in which the width of the neighboring pixels 52 vertically adjacent thereto is larger than the width of the neighboring pixels 52 horizontally adjacent thereto and FIG. 4(c) illustrating an example where the width of the neighboring pixels 52 is made large in accordance with the size of the synchronized pixels 51.
Figure 4B:
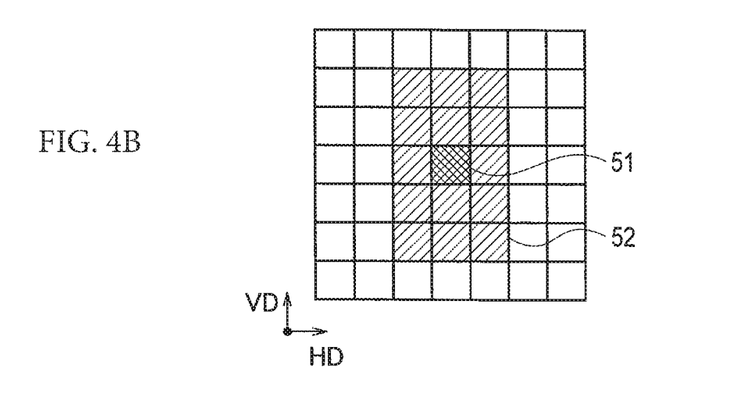
Figure 4C:
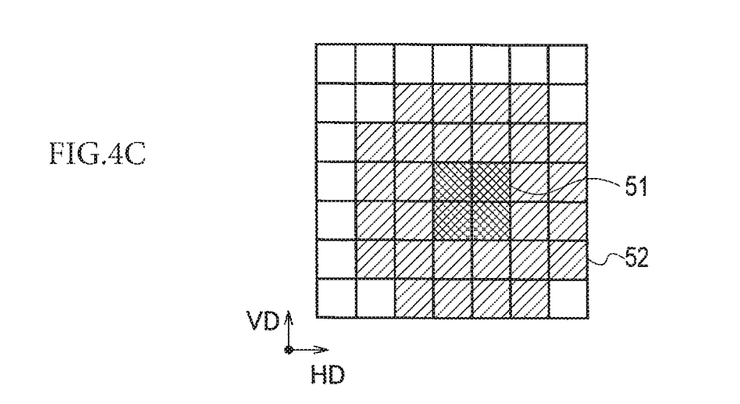

The pixel group setting unit 38 sets a predetermined range including a synchronized pixel as a pixel group. The pixel group includes the synchronized pixel and one or more neighboring pixels adjacent to and around the synchronized pixel. The detail will be described later with reference to FIG. 4.

The traffic light judging unit 18 judges whether a traffic light is present or not at the position of the pixel group including the synchronized pixel set by the pixel group setting unit 38 based on the detection stability and the hue of the synchronized pixel. When images of a distant traffic light are captured, the observation position of the measurement object (traffic light) varies because of the vibration of the traveling vehicle or other factors. To deal with this, the stability judging unit 39 judges for a predetermined determination period whether or not the synchronized pixel is consecutively extracted from the pixel group. When the position of the synchronized pixel is varying within the area of the pixel group, the stability judging unit 39 judges that the synchronized pixel is being stably detected.

The hue judging unit 40 judges whether or not the hue of the synchronized pixel is similar to that of a signal color. Since the observation position of the measurement object (traffic light) varies because of the vibration of the vehicle or other factors, the hue judging unit 40 may judge whether or not the hue synthesized from the hues of all the synchronized pixels included in the pixel group is similar to a signal color. When a synchronized pixel is consecutively extracted from the pixel group at least for the predetermined determination period, the traffic light judging unit 18 judges that a traffic light is present at the position of the pixel group. Here, the traffic light judging unit 18 may judge that a traffic light is present at the position of the pixel group when a synchronized pixel is consecutively extracted from the pixel group for the predetermined determination period, and the hue synthesized from the hues of all the synchronized pixels included in the pixel group is similar to a signal color.

Electric lights which light by receiving the supply of the electric power from the commercial power supply include not only signal lamps of traffic lights but also other electric lights that light on the road, such as streetlights, vending machines, and signboards. The synchronized pixels extracted by the synchronized image generating unit 15 may include one extracted from these other electric lights. By the hue judging unit 40 judging the similarity in hue between the synchronized pixels and the signal colors, it is possible to exclude these other electric lights from a judgment result by the stability judging unit 39.

Here, the traffic light judging unit 18 may be configured to judge whether or not a traffic light is present from the judgment result by the stability judging unit 39 using the position on the images and the luminance of the synchronized pixel, instead of using the hue judging unit 40. By determining positions of traffic lights on the images from map information on the surroundings of the vehicle and matching the determined positions with that of the synchronized pixel, it is possible to exclude these other electrical lights. In addition, by estimating the luminance of a traffic light on the images from the distance from the vehicle to the traffic light, it is also possible to judge that the traffic light is present at a synchronized pixel having the luminance within the estimation.

The traffic light detecting unit 12 outputs to the vehicle CPU 13 the positional information of the pixel group at which the traffic light judging unit 18 judges that a traffic light is present.

Next, with reference to FIGS. 2 and 3(*a*), 3(*b*), the synchronized image generating unit 15 will be described in detail. With reference to FIG. 2, the configuration of a synchronized image generating unit 15 will be described in detail. The synchronized image generating unit 15 includes a memory 25, a multiplying unit 26, a low pass filter (LPF) 20, a phase judging unit 41, and a reference signal generating unit 17.

The memory 25 stores a series of multiple camera images (frames) 28 at a time. For example, the memory 25 stores the multiple camera images 28 at a time which are captured during one alternating current cycle of the electric power supplied to the traffic lights. The multiplying unit 26 multiplies the reference signal and a luminance signal of each pixel of the camera images read out from the memory 25 together. The multiplying unit 26 performs the above multiplication for each of the camera images stored at a time in the memory 25.

The LPF 20 extracts only the low frequency components by reducing the levels of the frequency components higher than a predetermined cutoff frequency out of the multiplication results by the multiplying unit 26, and outputs a synchronized image including the synchronized pixel. The phase judging unit 41 judges whether or not the luminance of the synchronized pixel outputted from the LPF 20 is higher than or equal to a predetermined reference value. If the luminance is lower than the predetermined reference value, the phase judging unit 41 instructs the reference signal generating unit 17 to adjust the phase of the reference signal. If the luminance is higher than or equal to the predetermined reference value, it is possible to judge that the phase of the reference signal is matched to the phase of the electric power supplied to the traffic lights. Thus, the phase adjustment is not necessary, and the synchronized image generating unit 15 outputs the synchronized image outputted from the LPF 20 to the pixel group setting unit 38 illustrated in FIG. 1.

The reference signal generating unit 17 adjusts the phase of the reference signal based on the judgment result made by the phase judging unit 41. The multiplying unit 26 multiplies the reference signal the phase of which has been adjusted and the luminance signal together. In this way, the synchronized image generating unit 15 repeatedly performs the PLL process to adjust the phase until the luminance becomes higher than or equal to the predetermined reference value.

With reference to FIGS. 3(*a*) and 3(*b*), the phase matching of the reference signal will be described. FIG. 3(*a*) illustrates a state where the phase of the reference signal is matched to that of the electric power supplied to the traffic lights. By multiplying 1) the luminance signal of each pixel and 2) the reference signal together in this state, 3) the signal after the multiplication, that is, the luminance of the synchronized pixel and the average value (correlation value G1) of the luminance of the synchronized pixel become the largest.

In contrast, FIG. 3(*b*) illustrates a state where the phase of the reference signal is inverted with respect to that of the electric power supplied to the traffic lights. By multiplying 1) the luminance signal of each pixel and 2) the reference signal together in this state, 3) the signal after the multiplication, that is, the luminance of the synchronized pixel and the average value (correlation value G2) of the luminance of the synchronized pixel become the smallest.

As the distance from the vehicle to a traffic light becomes longer, the luminance of a signal lamp detected by the image capturing unit 11 becomes lower, and the range of the luminance variation becomes smaller. To deal with this, by bringing the phase of the reference signal close to that of the luminance variation of the signal lamp, that is, the phase of the electric power supplied to the traffic light, it is possible to obtain the high correlation value (G1), which in turn makes it possible to detect the distant traffic light with high accuracy.

Next, with reference to FIGS. 4(*a*)-(*c*), descriptions will be provided for a setting process on the pixel group. Each of FIGS. 4(*a*), 4(*b*), and 4(*c*) illustrates an example of a pixel group 50 which is set for the predetermined range including a synchronized pixel 51. Each frame arranged in a matrix form indicates a pixel. FIG. 4(*a*) indicates a pixel group 50 including neighboring pixels 52, each adjacent to a synchronized pixel 51 horizontally or vertically. FIG. 4(*b*) illustrates an example of a pixel group 50 in which the width of the neighboring pixels 52 vertically adjacent to the synchronized pixel 51 is larger than the width of the neighboring pixels 52 horizontally adjacent to the synchronized pixel 51. One line of neighboring pixels 52 is horizontally adjacent to the synchronized pixel 51, while two lines of neighboring pixels 52 are vertically adjacent to the synchronized pixel 51. The pixel group 50 in FIG. 4(*b*) is an example to deal with the vertical vibration of the vehicle. FIG. 4(*c*) illustrates an example of increasing the width of the neighboring pixels 52 in accordance with the size of the synchronized pixels 51. The pixel group setting unit 38 sets two lines of the neighboring pixels 52 adjacent to a total of four synchronized pixels 51 arranged in 2×2 in each of the horizontal and vertical directions.

In order to keep the continuity of the luminance variation, the pixel group setting unit 38 may superpose the luminance value of the synchronized pixel 51 on those of the neighboring pixels 52. Even when the position of the synchronized pixel 51 moves in the area of the neighboring pixels 52, it is possible to keep the continuity of the luminance variation between before and after the movement. The detail will be described later with reference to FIG. 8.

Figure 5:
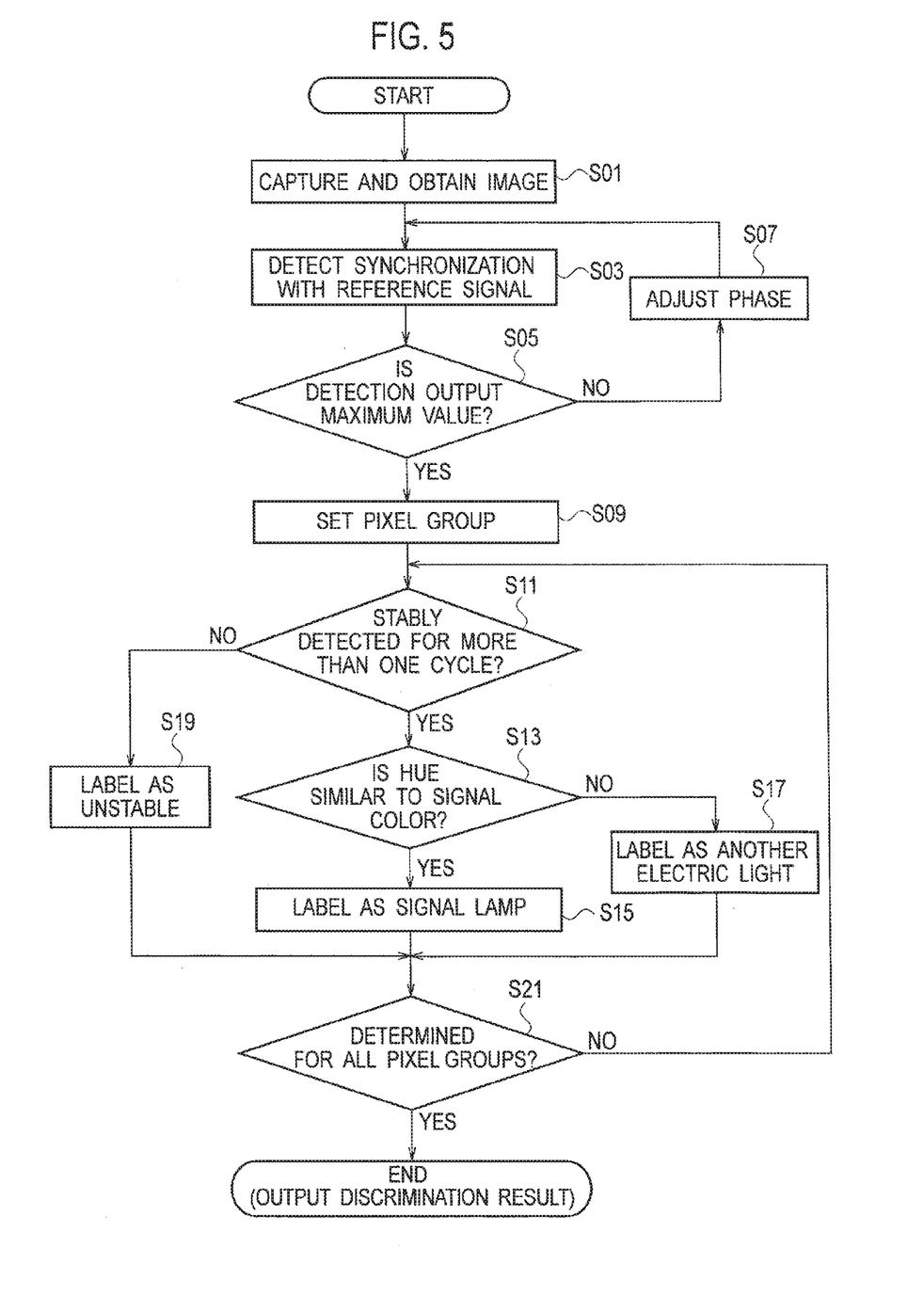
FIG. 5 is a flowchart illustrating an example of a traffic light detecting method using the traffic light detecting device illustrated in FIG. 1.

Next, with reference to FIG. 5, descriptions will be provided for a traffic light detecting method using the traffic light detecting device illustrated in FIG. 1. The operation of the traffic light detecting device illustrated in the flowchart of FIG. 5 starts as soon as the ignition switch of the vehicle turns on and the traffic light detecting device is activated. The operation is repeatedly executed until the traffic light detecting device stops.

In step S01, the image capturing unit 11 repeatedly captures images ahead of the vehicle and obtains a series of the multiple camera images. The image capturing unit 11 captures the multiple images during one alternating current cycle of the electric power supplied to the traffic lights. The obtained image data are transferred to the synchronized image generating unit 15 and temporarily stored in the memory 25.

The processing proceeds to step S03, where the multiplying unit 26 performs the synchronization detection process of multiplying the reference signal and a luminance signal of each pixel of the camera images together. The processing proceeds to step S05, where the phase judging unit 41 judges whether or not the correlation value (G1, G2) illustrated in FIG. 3 is a maximum value. If it is the maximum value (YES at S05), the processing proceeds to step S09. If it is not the maximum value (NO at S05), the processing proceeds to step S07. Note that, in step S05, the phase judging unit 41 may judge whether or not the correlation value (G1, G2) is larger than or equal to the predetermined reference value instead of judging whether or not it is the maximum value. In step S07, the reference signal generating unit 17 adjusts the phase of the reference signal and then returns to step S03. In this way, the traffic light detecting device repeatedly performs the synchronization detection process and the phase adjustment process until the correlation value (G1, G2) becomes the maximum value.

In step S09, the pixel group setting unit 38 set the predetermined range including the synchronized pixel 51 as a pixel group 50 as illustrated in FIG. 4. The processing proceeds to step S11, where the stability judging unit 39 judges whether or not the synchronized pixel 51 is continuously extracted from the pixel group 50 for longer than one alternating current cycle of the electric power supplied to the traffic lights. When the synchronized pixel 51 is continuously extracted (YES in S11), there is a possibility that the synchronized pixel 51 may be a signal lamp, and the processing proceeds to step S13. On the other hand, when the synchronized pixel 51 is not continuously extracted (NO in S11), it is possible to judge that the synchronized pixel 51 is not a signal lamp, and the processing proceeds to step S19. In step S19, the traffic light judging unit 18 eliminates the synchronized pixel 51 from a candidate list of traffic lights.

In step S13, the hue judging unit 40 judges whether or not the hue synthesized from the hues of all the synchronized pixels 51 included in the pixel group 50 is similar to that of a signal color. If the hue is similar to a signal color (YES in S13), it is possible to judge that the synchronized pixels 51 in the pixel group 50 indicate a signal lamp. Accordingly, the processing proceeds to step S15 and the traffic light judging unit 18 labels the synchronized pixels 51 as a traffic light. If the hue is not similar to a signal color (No in S13), it is possible to judge that the synchronized pixels 51 in the pixel group 50 do not indicate a signal lamp but one of other electric lights. Accordingly, the processing proceeds to step S17, where the traffic light judging unit 18 labels the synchronized pixels 51 as the another electric light.

The processing proceeds to step S21, where the traffic light judging unit 18 judges whether or not the judgments have been made for all the pixel groups 50 set in step S09 on whether or not each of the pixel groups 50 indicates a traffic light. If all the judgments have not finished yet (NO in S21), the processing returns to step S11, and steps S11 to S17 are performed for the remaining pixel groups 50. If all the judgments have finished (YES in S21), the flowchart in FIG. 5 ends.

As described above, the following operation and effect can be obtained according to the embodiment.

Figure 6A:
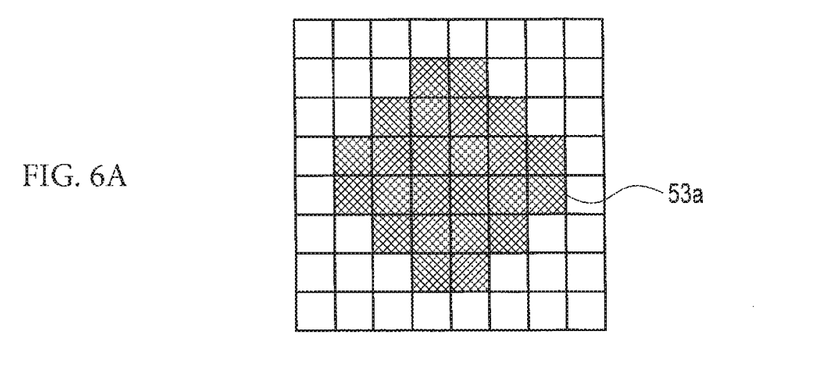
FIG. 6(a) is a diagram indicating the necessary size of a pixel group 53a to detect a candidate for a signal lamp from the circularity.
Figure 6B:
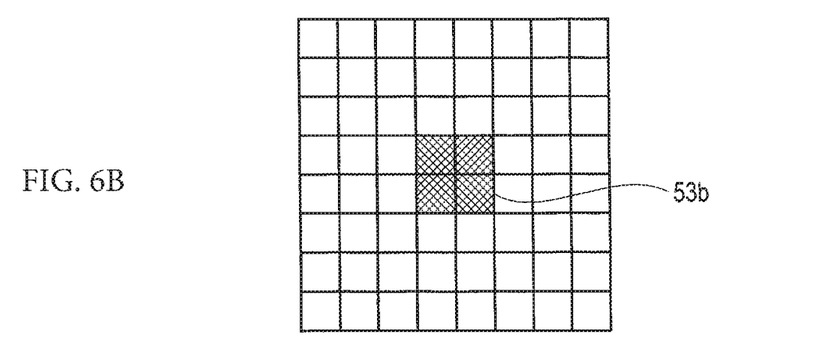
FIG. 6(b) is a diagram indicating the number of synchronized pixels 53b which can be detected in the embodiment.

According to Japanese Patent Application Publication No. 2005-301518, an area (pixel group 53a) with a hue similar to that of a signal lamp is extracted from camera images, and a candidate for a signal lamp is detected based on the circularity of the area (pixel group 53a). When circularity is used to judge whether or not a signal lamp is present, the area (pixel group 53a) needs to include about the same number of pixels as illustrated in FIG. 6(a). On the other hand, in the traffic light detecting device according to the embodiment, synchronized pixels with a luminance which varies in synchronization with the alternating current cycle of the electric power supplied to the traffic lights are extracted as a candidate for a signal lamp. This makes it possible to judge whether or not the synchronized pixels 53b indicate a signal lamp, even though the number of the synchronized pixels 53b is too small to judge the circularity as illustrated in FIG. 6(b). In other words, the traffic light detecting device according to the embodiment detects a distant traffic light with high accuracy.

By extracting out of the camera images the synchronized pixels with a luminance which varies in synchronization with the alternating current cycle of the electric power supplied to the traffic lights, it is possible to detect a traffic light without considering the size or the shape of the signal lamp. Accordingly, it is possible to detect even a distant traffic light with high accuracy, even though the image size of the traffic light is too small to determine the circularity.

Figure 7A:
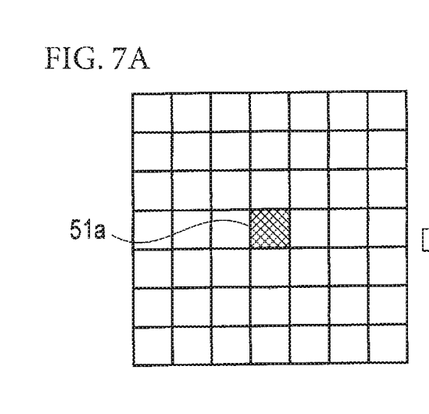
FIGS. 7(a) to 7(d) are diagrams illustrating states where the position (51a, 51b) of a synchronized pixel varies because of the vibration of a traveling vehicle or other factors.
Figure 7B:
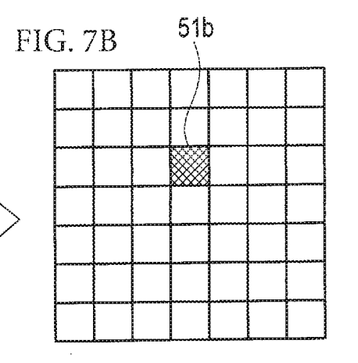
Figure 7C:
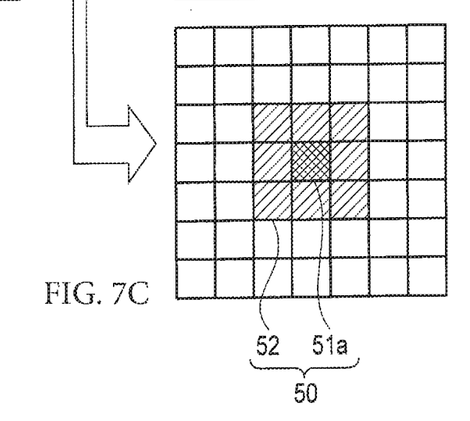
Figure 7D:
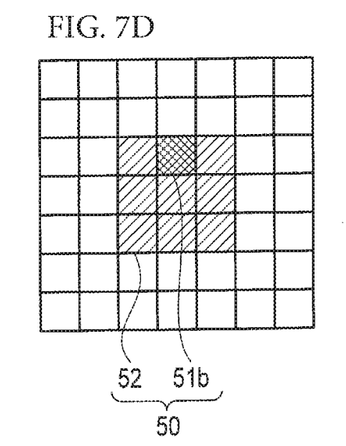

In addition, when images of a distant traffic light are captured, the observation position of the measurement object varies because of the vibration of a traveling vehicle or other factors. FIGS. 7(a) and 7(b) illustrate a state where the position of a synchronized pixel (51a, 51b) varies at each processing cycle illustrated in FIG. 5. It is difficult to continuously detect a synchronized pixel at the same position (pixel) for more than a predetermined determination period (for example, one alternating current cycle) because of the vibration of a traveling vehicle or other factors. To address this, the predetermined range including a synchronized pixel is set as a pixel group as illustrated in FIG. 4, and when the synchronized pixel is continuously extracted from the pixel group for the predetermined determination period, it is judged that a traffic light is present. This makes it possible to keep on detecting a signal lamp synchronized with the alternating current cycle of the electric power, which in turn makes it possible to stably detect the position of the traffic light. For example, as illustrated in FIGS. 7(c) and 7(d), even though the position of the synchronized pixel (51a, 51b) varies within the area of the pixel group 50, the stability judging unit 39 is capable of continuously detecting the synchronized pixel.

Figure 8:
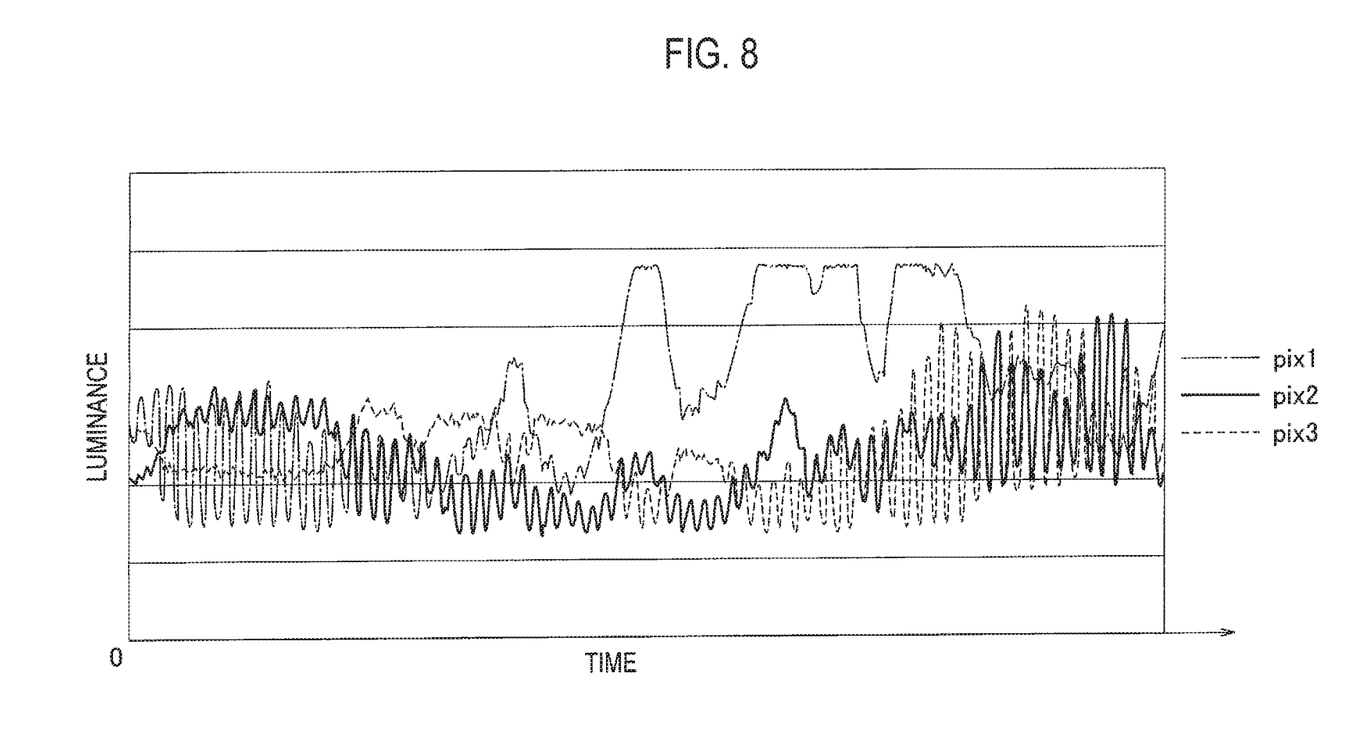
FIG. 8 is a graph illustrating a state where a cyclic luminance variation transfers among three pixels (pix 1, pix 2, pix 3)

FIG. 8 is a graph illustrating a state where a cyclic luminance variation transfers among three pixels (pix 1, pix 2, pix 3) over time. First, a luminance variation synchronized with the alternating current cycle of the electric power is observed in the pixel (pix 1), then transfers to the pixel (pix 2), and finally transfers to the pixel (pix 3). Accordingly, the position of the synchronized pixel also varies.

To deal with this, the pixel group setting unit 38 may superpose the luminance value of the synchronized pixel 51 on those of neighboring pixels 52 to keep the continuity of the luminance variation. By doing this, in the example illustrated in FIG. 8, the luminance variations are superposed among the three pixels (pix 1, pix 2, pix 3). Accordingly, the transfer of variations as illustrated in FIG. 8 does not occur, and it is possible to detect three pixels (pix 1, pix 2, pix 3) continuously as synchronized pixels.

Figure 9A:
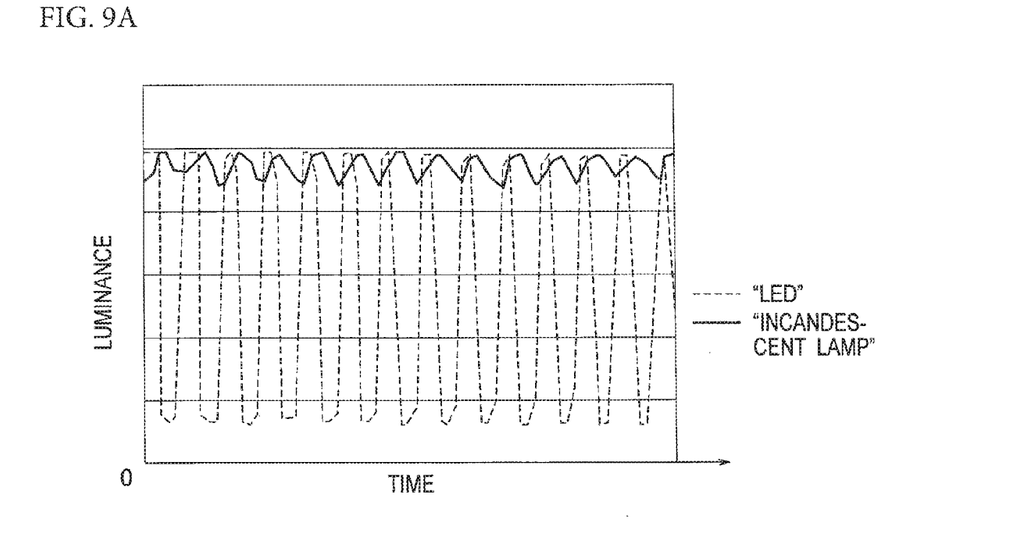
Figure 9B:
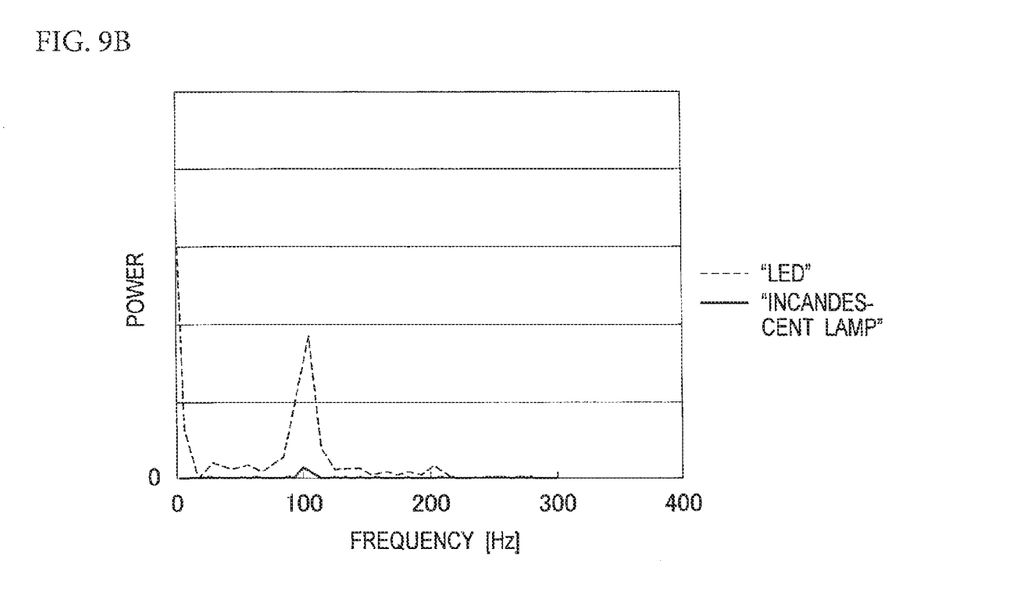
FIG. 9(b) illustrating the frequency analysis result using FFT analysis.

FIGS. 9(a) and 9(b) are graphs for comparing the range of the luminance variation between an LED lamp and an incandescent lamp. LED lamps are used for the signal lamps of some traffic lights, and incandescent lamps are used for the others. The luminances of the LED lamp and the incandescent lamp vary in the same cycle. However, they are very different in the range of the luminance variation. Since the incandescent lamp has a worse ratio (S/N ratio) of the luminance of the traffic light to the image noise than the LED lamp, it is difficult to detect the luminance variation of the incandescent lamp.

For this reason, the traffic light judging unit may change the predetermined determination period in accordance with the range of the luminance variation of the synchronized pixel. Specifically, in step S11, when the luminance of a synchronized pixel has a larger variation range, the stability judging unit 39 sets a shorter predetermined determination period. For example, for LED lamps, one alternating current cycle of the electric power supplied to the traffic lights is set as the predetermined determination period because the range of the luminance variation is large. For incandescent lamps, since the range of the luminance variation is small, 10 cycles of the electric power supplied to the traffic light are set as the predetermined determination period. Meanwhile, the predetermined determination period may be set longer for a farther traffic light because the range of the luminance variation of the synchronized pixel is smaller. As described above, since the predetermined determination period is set long when the range of the luminance variation is small, as the predetermined determination period becomes longer, the number of times the pixel group is superposed increases, and this makes it possible to improve the S/N ratio. In this way, it is possible to set a suitable determination period in accordance with the type of a signal lamp or the distance to a traffic light. In other words, it is possible to enhance the detection sensitivity by setting a suitable determination period, using a synthesized waveform obtained by multiplying multiple waveforms of luminance variations existing in the determination period, and performing a synchronization determination with the alternating current cycle of the electric power.

As illustrated in FIGS. 4(a) to 4(c), the pixel group 50 includes a synchronized pixel 51 and one or more neighboring pixels 52 adjacent to and around the synchronized pixel 51. This makes it possible to stably detect a synchronized pixel 51 within a range of the pixel group 50 even when the observation position of the synchronized pixel 51 varies because of the vibration of the travelling vehicle or other factors.

As illustrated in FIG. 4(b), the width of the neighboring pixels 52 vertically adjacent to the synchronized pixel 51 may be larger than the width of the neighboring pixels 52 horizontally adjacent to the synchronized pixel 51. This makes it possible to stably detect the synchronized pixel 51 within the range of the pixel group 50 even when the observation position vertically varies because of the vibration of the travelling vehicle.

As illustrated in FIG. 4(c), the more number of synchronized pixels 51 exist in one pixel group 50, the larger width of the neighboring pixels 52 the pixel group setting unit 38 may set in the pixel group 50. This makes it possible to set a pixel group 50 for a suitable area in accordance with the size of the synchronized pixels 51.

As illustrated in FIG. 5, when a synchronized pixel 51 is continuously extracted from the pixel group 50 for the predetermined determination period (YES in S11), and the hue of the synchronized pixel 51 is similar to that of a signal color (YES in S13), the traffic light judging unit 18 may judge that a traffic light is present at the position of the synchronized pixel 51. Judging the hue of the synchronized pixel 51 further improves accuracy in detecting a traffic light.

The hue judging unit 40 may judge whether or not the hue synthesized from the hues of all the synchronized pixels 51 included in the pixel group 50 is similar to the hue of a signal color. Even when the position of an imaging object varies because of the vibration of the vehicle or other factors, it is possible to make an accurate hue judgment.

Although the embodiment of the present invention has been mentioned as described above, one should not understand that the statements and the drawings as part of the disclosure limit the present invention. From this disclosure, various modified embodiments, examples, and operation techniques will be apparent to those who skilled in the art.

Although the traffic light judging unit 18 judges both the extraction stability and the hue of the synchronized pixel (S11, S13) in the flowchart illustrated in FIG. 5, the traffic light judging unit 18 may judge only the extraction stability of the synchronized pixel (S11). In this case, if a synchronized pixel is detected for more than one cycle of the alternating current power (YES in S11), the processing proceeds to S15, and the synchronized pixel may be labeled as a signal lamp.

REFERENCE SIGNS LIST 11 image capturing unit
12 traffic light detecting unit
15 synchronized image generating unit (synchronized pixel extracting unit)
17 reference signal generating unit
18 traffic light judging unit
38 pixel group setting unit
40 hue judging unit
50 pixel group
51, 51a, 51b synchronized pixel
52 neighboring pixel

The invention claimed is:

1. A traffic light detecting device comprising:
a camera mounted on a vehicle and configured to capture an image of surroundings of the vehicle; and
a traffic light detecting circuit configured to detect a traffic light from the image, wherein
the traffic light detecting circuit includes:
a synchronized pixel extracting unit configured to extract from the image a synchronized pixel with a luminance which varies in synchronization with an alternating current cycle of electric power supplied to the traffic light;
a pixel group setting unit configured to set a predetermined range including the synchronized pixel and neighboring pixels of the synchronized pixel as a pixel group; and
a traffic light judging unit configured to judge from the synchronized pixel whether or not the traffic light is present when the synchronized pixel is continuously extracted from the pixel group for a predetermined determination period.

2. The traffic light detecting device according to claim 1, wherein
the pixel group includes the synchronized pixel and one or more neighboring pixels adjacent to and around the synchronized pixel.

3. The traffic light detecting device according to claim 2, wherein
a width of neighboring pixels vertically adjacent to the synchronized pixel is larger than a width of the neighboring pixels horizontally adjacent to the synchronized pixel.

4. The traffic light detecting device according to claim 2, wherein
when the number of the synchronized pixels in the pixel group is larger, the pixel group setting unit sets the width of the neighboring pixels in the pixel group larger.

5. The traffic light detecting device according to claim 1, wherein
the traffic light judging unit includes a hue judging unit configured to judge whether or not a hue of the synchronized pixel is similar to a hue of a signal color, and
the traffic light judging unit judges that the traffic light is present at a position of the synchronized pixel when the synchronized pixel is continuously extracted from the pixel group for a predetermined period, and the hue of the synchronized pixel is similar to a hue of the signal color.

6. The traffic light detecting device according to claim 1, wherein
the traffic light judging unit changes the predetermined determination period in accordance with a range of a luminance variation of the synchronized pixel.

7. The traffic light detecting device according to claim 5, wherein
the hue judging unit judges whether or not a hue synthesized from the hues of all the synchronized pixels in the pixel group is similar to the hue of the signal color.

8. The traffic light detecting device according to claim 2, wherein
the pixel group setting unit superposes a luminance value of the synchronized pixel on those of the neighboring pixels.

9. A traffic light detecting method, comprising:
capturing an image of surroundings of a vehicle;
extracting from the image a synchronized pixel with a luminance which varies in synchronization with an alternating current cycle of electric power supplied to a traffic light;
setting a predetermined range including the synchronized pixel and neighboring pixels of the synchronized pixel as a pixel group; and
judging from the synchronized pixel whether or not the traffic light is present when the synchronized pixel is continuously extracted from the pixel group for a predetermined determination period.

\* \* \* \* \*